(12) United States Patent
Bevacqua et al.

(10) Patent No.: US 12,714,950 B2
(45) Date of Patent: Aug. 25, 2026

(54) REACTOR AND PROCESS FOR THE PRECIPITATION OF A SOLID PRODUCT

(71) Applicant: RESOURSEAS S.R.L., Palermo (IT)

(72) Inventors: Maurizio Bevacqua, Palermo (IT); Fabrizio Vassallo, Palermo (IT); Andrea Cipollina, Palermo (IT); Giorgio Micale, Palermo (IT); Alessandro Tamburini, Palermo (IT); Michael Papapetrou, Palermo (IT); Fabrizio Vicari, Palermo (IT)

(73) Assignee: RESOURSEAS S.R.L., Palermo (IT)

( * ) Notice: Subject to any disclaimer, the term of this patent is extended or adjusted under 35 U.S.C. 154(b) by 385 days.

(21) Appl. No.: 18/560,363

(22) PCT Filed: May 11, 2022

(86) PCT No.: PCT/IB2022/054367

§ 371 (c)(1),
(2) Date: Nov. 10, 2023

(87) PCT Pub. No.: WO2022/238913

PCT Pub. Date: Nov. 17, 2022

(65) Prior Publication Data

US 2024/0238696 A1 Jul. 18, 2024

(30) Foreign Application Priority Data

May 14, 2021 (IT) ........................ 102021000012473

(51) Int. Cl.
*B01D 9/00* (2006.01)
*B01F 25/313* (2022.01)

(52) U.S. Cl.
CPC ............ *B01D 9/005* (2013.01); *B01F 25/313* (2022.01)

(58) Field of Classification Search
CPC .............................. B01D 9/005; B01F 25/313
See application file for complete search history.

(56) References Cited

U.S. PATENT DOCUMENTS 7,449,166 B2 * 11/2008 Tanaka ................... B82Y 30/00 423/610
7,811,381 B2 * 10/2010 Sirkar ...................... C13K 1/10 117/70

FOREIGN PATENT DOCUMENTS

CN 105582689 A * 5/2016 ........... B01D 9/0027
CN 105885941 B * 10/2017

(Continued)

OTHER PUBLICATIONS

Ruiz, Salmon, et al., "Membrane Crystallization Via Membrane Distillation", Chemical Engineering and Processing: Process Intensification, vol. 123, Jan. 1, 2018, pp. 258-271, XP055885595, CH ISSN: 0255-2701, DOI: 10.1016/j.cep.2017-11-017, pgs.

(Continued)

*Primary Examiner* — Robert M Kunemund
(74) *Attorney, Agent, or Firm* — Merchant & Gould P.C.

(57) ABSTRACT

A reactor and a relative process are for precipitation of a solid substance from a solution, in particular a reactive precipitation or crystallization. The reactor is a reactive precipitation/crystallization reactor, including an outer tubular element and a coaxial inner tubular element along a longitudinal axis of the reactor, to form an annular channel between an outer wall of the inner tubular element and an inner wall of the outer tubular element. The outer tubular element includes, at a first end, an inlet opening for a first reactive fluid and, at a second end, an outlet opening for a reaction mixture. The inner tubular element includes an inlet opening for a second reactive fluid and, optionally, an outlet opening for the second reactive fluid. The inner tubular (Continued)

element includes, along the outer surface, dispensing openings for dispensing the second reactive fluid fed into the inner tubular element.

14 Claims, 9 Drawing Sheets

(56) References Cited

FOREIGN PATENT DOCUMENTS

| | | | | |
|---|---|---|---|---|
| EP | 0873185 A1 | | 10/1998 | |
| EP | 3808424 A1 | | 4/2021 | |
| JP | 4490016 B2 | * | 6/2010 | ......... B01D 11/0407 |

OTHER PUBLICATIONS

International Search Report and Written Opinion received for PCT Serial No. PCT/IB2022/054367 on Oct. 31, 2022, 20 pgs.

* cited by examiner 2
3a
3
4
2a
6a
6
Z
Z''
Z'
L
5a
5

2
10'
12
3
12
3a
2a
4
11
12

3
4
12
2
2a
3a
12
10'
12
11

12
2a
2
3
12
4
11
12
12
10'
3a

REACTOR AND PROCESS FOR THE PRECIPITATION OF A SOLID PRODUCT

CROSS-REFERENCE TO RELATED APPLICATIONS

The present application is a National Stage Filing of PCT International Application No. PCT/IB2022/054367 filed on May 11, 2022, which claims benefit of priority to Italian Patent Application No. 102021000012473, filed on May 14, 2021, and which applications are incorporated herein by reference. To the extent appropriate, a claim of priority is made to each of the above disclosed applications.

FIELD OF THE INVENTION

The present invention relates to a reactor and to a relative process for the precipitation of a solid substance from a solution, in particular for a reactive precipitation or crystallization.

PRIOR ART

The methods for the precipitation of a solid from a solution are widely used, both in organic and inorganic chemistry, to separate a substance from other compounds possibly present in solution or, in any case, to isolate a substance in solid form. Precipitation may give rise to a substance in an amorphous or crystalline form. This latter case is called crystallization.

The precipitation or crystallization methods, in addition to being used, as mentioned, for recovering a more or less pure solid from a solution, are also widely used for the purification of the substance recovered, or for the transformation thereof, for example, from an amorphous form to a crystalline form or from a crystalline form to a different crystalline form (polymorphs, hydrates, solvates, etc.). Such cases are often called reprecipitation or recrystallization.

There are various types of (re)precipitation or (re)crystallization methods. A first method involves a simple precipitation by cooling of the solution, in some cases after heating it up to a temperature such as to solubilize the solid compounds possibly present in the solution.

A second method involves the precipitation of a substance by concentrating the solution, which may occur by heating and subsequently cooling or by natural evaporation. The latter is the method for recovering salt from seawater in saltworks.

A third method, on the other hand, involves the precipitation by adding an antisolvent in which the substance to be recovered is substantially insoluble.

A different method, known as reactive precipitation or crystallization, allows the precipitation of an insoluble compound following a chemical reaction, typically an acid-base reaction. Such method is commonly used for recovering cationic or anionic species by forming insoluble salts, conventionally, but not necessarily, inorganic salts. For example, magnesium hydroxide, lithium carbonate, barium sulphate, etc. may be isolated in this manner.

In the case of (re)crystallization, the kinetics for the formation of a crystal follow precise rules. The formation of a single solid particle, the so-called crystallization germ. is the starting point of the crystallization process, acting as an agglomerate for the growth of the solid. Anything which favors the formation of the first germ (nucleation) or the subsequent growth favors solidification. For example, the presence of a metal surface favors the formation of the first germ while the evaporation, with the effect of increasing the concentration, intensifies intermolecular interactions, favoring agglomeration. Slow crystallization favors the creation of large, well-formed crystals.

SUMMARY OF THE INVENTION

The issue underlying the present invention is therefore that of providing a reactor for conducting a precipitation or crystallization method which allows to obtain a solid precipitate of high purity, with a high recovery percentage and with the possibility of controlling the precipitation/crystallization kinetics.

Such problem is solved by a reactor and by a precipitation process as defined in the accompanying claims, the definitions of which form an integral part of the present description for the purpose of sufficiency of disclosure.

It is a first object of the present invention a reactive precipitation/crystallization reactor, comprising an outer tubular element and an inner tubular element, coaxial with respect to the outer tubular element along a longitudinal axis of the reactor, so as to form, between an outer wall of the inner tubular element and an inner wall of the outer tubular element, an annular channel, in which the outer tubular element comprises, at a first end, an inlet opening for a first reactive fluid and, at a second end, an outlet opening for a reaction mixture, and in which the inner tubular element comprises an inlet opening for a second reactive fluid and, optionally, an outlet opening for said second reactive fluid, wherein the inner tubular element comprises, along the outer surface thereof, a plurality of dispensing openings for dispensing said second reactive fluid fed into the inner tubular element.

It is a further object of the present invention a precipitation/crystallization process which includes the following steps:

i) providing a reactor as defined above;
ii) introducing a first reactive fluid into the annular channel, at a first end of the outer tubular element, so as to create a spiral flow;
iii) at the same time, introducing a second reactive fluid into the inner tubular element;
iv) putting in contact, by means of a plurality of openings, preferably provided with nozzles, said first reactive fluid with said second reactive fluid in said annular channel, generating a reaction mixture with spiral flow;
v) extracting said reaction mixture from said annular channel, at a second end of the outer tubular element;
vi) optionally, recirculating, wholly or in part, said reaction mixture into said annular channel at said first end of the outer tubular element.

BRIEF DESCRIPTION OF THE FIGURES

Further features and advantages of the present invention will become more apparent from the description of certain embodiments thereof, given hereafter only by way of a non-limiting, indicative example, with reference to the attached drawings.

DETAILED DESCRIPTION OF THE INVENTION

Figure 1:
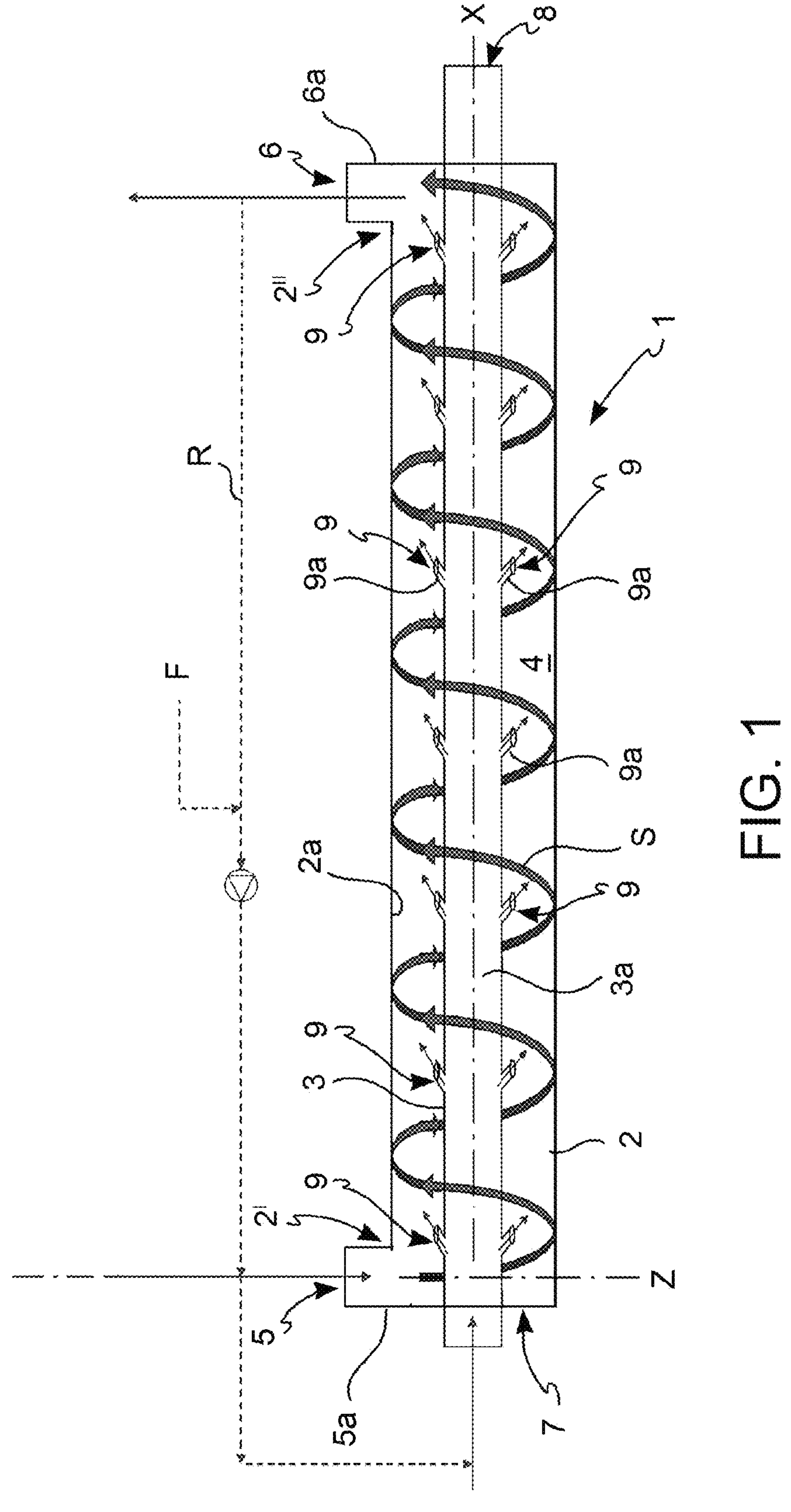
FIG. 1 shows a longitudinal section diagrammatic side view of the reactor of the invention.

The present invention mainly relates to a precipitation or crystallization reactor configured for a reactive precipitation/crystallization.

"Reactive precipitation/crystallization" means a process that involves the reaction in solution of two reagents to form an insoluble product in the solution. A preferred example of such a process is the precipitation of a salt, in particular an inorganic salt, by means of an acid-base reaction.

The term "precipitation" means the separation of a solid from a solution to separate a substance from other compounds possibly present in solution, in which the solid may be in an amorphous, crystalline, hydrated crystalline or solved crystalline form. The term "crystallization" specifically involves the formation of a solid in a crystalline, hydrated crystalline or solved crystalline form.

The term "reactive fluid" means a solution which includes compounds or species, in neutral, ionic or ionizable form, capable of reacting with another reagent to give an insoluble substance in the reaction medium.

The reactor of the present invention is particularly adapted for a reactive crystallization process, by virtue of the ability thereof to modulate precipitation kinetics.

With reference to FIGS. 1-5, the precipitation/crystallization reactor of the invention, indicated as a whole with numeral 1, is a tubular reactor which extends along a longitudinal axis X, comprising an outer tubular element 2, having an inner surface 2*a*, and an inner tubular element 3, having an outer surface 3*a*, the inner tubular element 3 being coaxial with respect to the outer tubular element 2 along said longitudinal axis X, so as to form an annular channel 4 between the outer wall 3*a* of the inner tubular element 3 and the inner wall 2*a* of the outer tubular element 2.

In preferred embodiments, the width L of the annular channel 4—i.e., the minimum distance between the inner surface 2*a* of the outer tubular element 2 and the outer surface 3*a* of the inner tubular element 3—is between 1.5 and 3 cm.

The outer tubular element 2 is closed at the two ends 2', 2" and comprises, at a first end 2', an inlet opening 5 for a first reactive fluid and, at a second end 2", an outlet opening 6 for a reaction mixture.

In preferred embodiments, the inlet 5 and outlet 6 openings are placed along first and second axes Z', Z" perpendicular to the longitudinal axis X of the reactor 1 and parallel to an intersecting axis Z that intersects said longitudinal axis X. More preferably, as clearly visible in FIGS. 4A and 4B, the first and second axes Z', Z" are offset by an equal distance on opposite sides with respect to the intersecting axis Z, for the reason which will be better clarified below.

The inlet 5 and outlet 6 openings may comprise connecting sleeves 5*a*, 6*a* for fluid inlet and outlet pipes.

The inner tubular element 3 comprises an inlet opening 7 for a second reactive fluid and optionally an outlet opening 8 for said second reactive fluid. The inlet 7 and outlet 8 openings are aligned with the longitudinal axis X of the reactor 1.

The inner tubular element 3 comprises, along the outer surface 3*a* thereof, a plurality of dispensing openings 9 for dispensing the second reactive fluid fed into the inner tubular element 3. In preferred embodiments, the dispensing openings 9 are arranged equally spaced apart along said longitudinal axis X. The number thereof may vary as a function of the length of the reactor 1 and, for example, may be between 8 and 16 dispensing openings 9.

Appropriate dispensing nozzles 9*a* are associated with the dispensing openings 9, preferably having a minimum dispensing diameter (diameter of the dispensing hole) of 0.1 mm and a maximum dispensing diameter of 5 mm. More preferably, the dispensing diameter of the dispensing nozzles 9*a* is between 1 mm and 4 mm.

The term "dispensing diameter" means the diameter of the end opening from which the fluid is dispensed by said nozzles.

The term "dispensing nozzle" means the end part of a duct from which a fluid flows, profiled so as to achieve the transformation into kinetic energy of a large part of the energy of the fluid itself.

The nozzle 9*a* comprises a channel having a first section with a larger diameter and a second section with a smaller diameter, in which said second section comprises said dispensing hole, so that the flow of the fluid passes from the larger diameter to the smaller one and, by virtue of the Venturi effect, the speed increases as the pressure decreases.

For the purposes of the present invention, the dispensing nozzles 9*a* may be made by profiling the openings 9, so as to achieve a Venturi effect as described above. This profiling may be obtained by means of the direct micromachining of the inner tubular element 3 with techniques such as mechanical micro-milling, laser engraving or the like. Alternatively, the dispensing nozzles 9*a* may be separate elements, selected among the conventional nozzles which are commercially available, inserted into the dispensing openings 9 so as to end flush with the outer surface 3*a* of the inner tubular element 3 or to protrude therefrom into the annular channel 4.

Figures 2, 3:
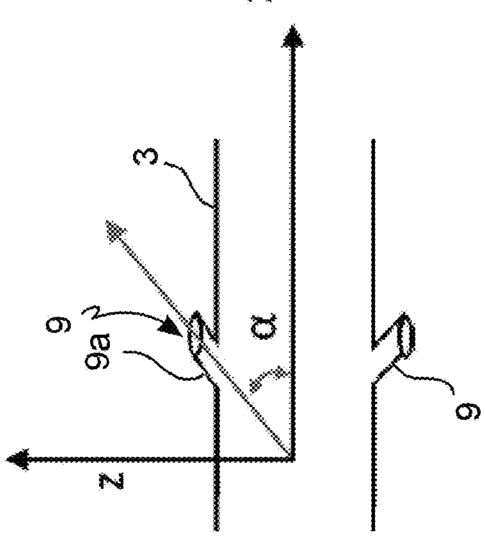
FIG. 2 shows a side view of a detail of the reactor in FIG. 1.
FIG. 3 shows a transverse section front view of the detail in FIG. 2.

As shown in FIGS. 2 and 3, which show a preferred embodiment of the invention, the dispensing nozzles 9*a* are inclined by an angle $\alpha$ with respect to the longitudinal axis X of the reactor 1 and by an angle $\beta$ with respect to a third axis Y which is perpendicular both to the longitudinal axis X and to the intersecting axis Z defined above. The angle $\alpha$ and the angle $\beta$ independently have a width between 5° and 60°, preferably between 15° and 45°. Thereby, the dispensing of the reactive fluid coming from the inner tubular element 3 into the annular channel 4 occurs in co-current with the fluid circulating in said annular channel 4, which—as shown in FIGS. 1, 4A, 4B and 5—has a spiral flow S.

Figures 4A, 4B:
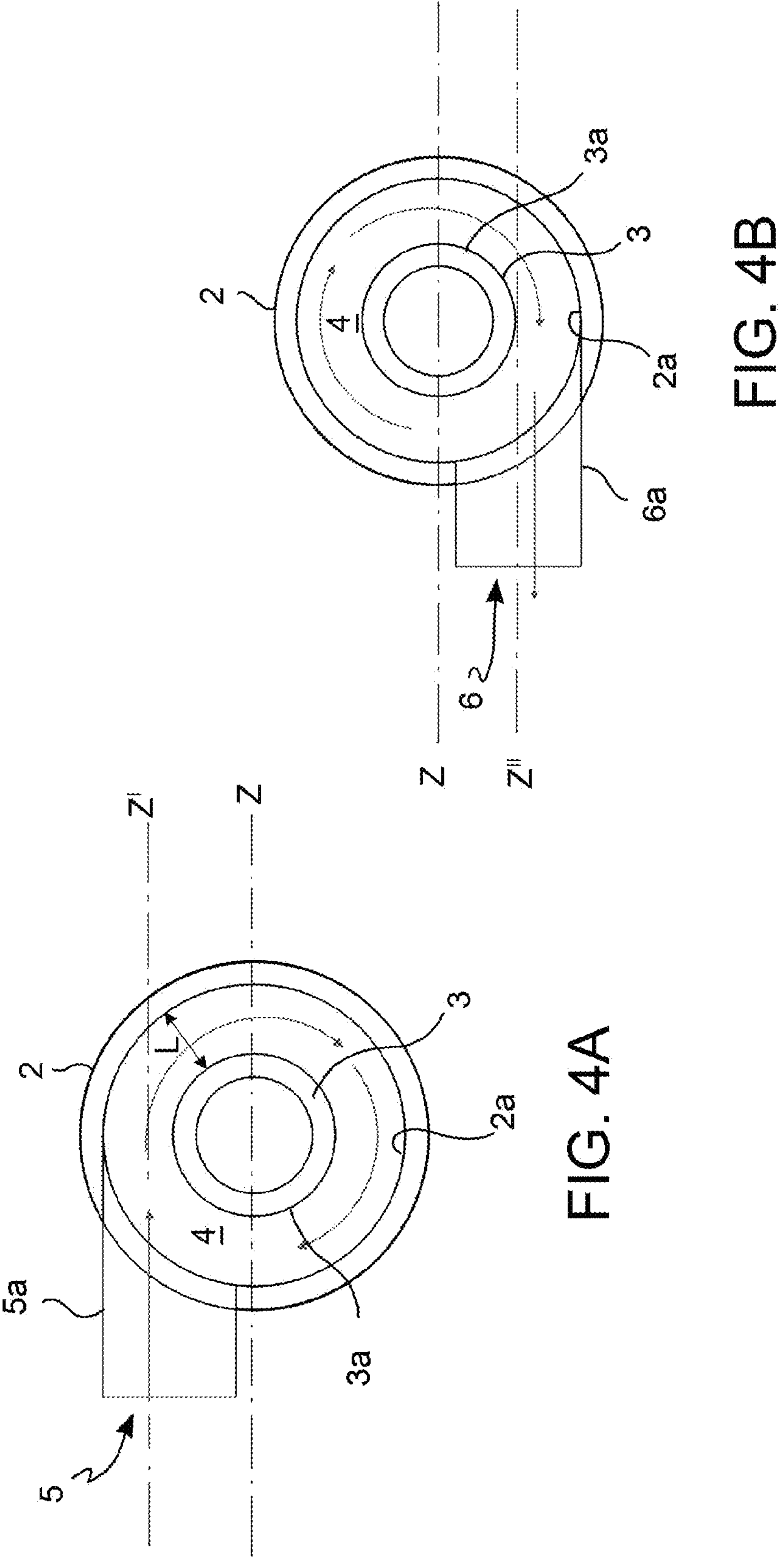
FIGS. 4A and 4B show two transverse section front views of the reactor of FIG. 1 according to sections A-A and B-B, respectively.

It should be noted that such spiral flow S is obtained by virtue of the arrangement of the openings 5, 6 along the respective first and second axes Z', Z" as stated above and as clearly visible in FIGS. 4A-4B whose arrows also show the direction of circulation of the fluid in the annular channel 4. The offsetting of the first and second axes Z', Z" has the purpose of favoring the inlet and outlet flow of the fluid, as shown by said arrows, thus creating a spiral current S. Thereby it is possible to obtain both a better mixing of the fluids as well as an extension of the contact times between the product to be crystallized and the reagent.

More specifically, the feeding by means of the inlet 5, as shown in FIG. 4A, occurs so that the inlet fluid stream of the first reactive fluid is forced to curve along the circular path delimited by the inner surface 2*a* of the outer tubular element 2 and the outer surface 3*a* of the inner tubular element 3.

Figure 5:
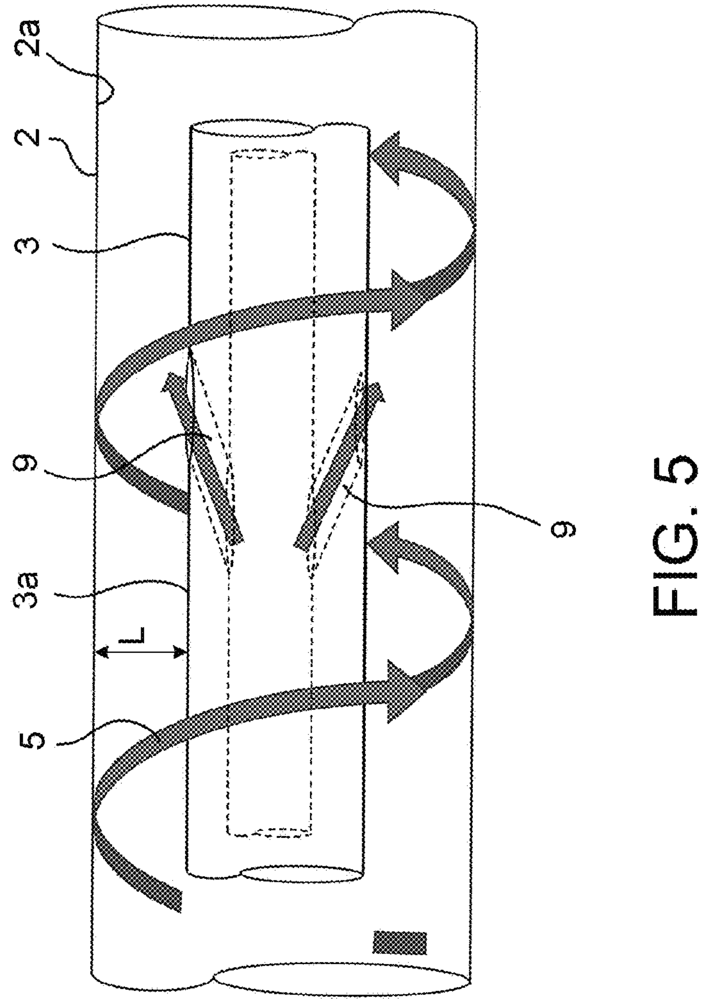
FIG. 5 shows a transparent side view of a portion of the reactor of FIG. 1.
Figure 6:
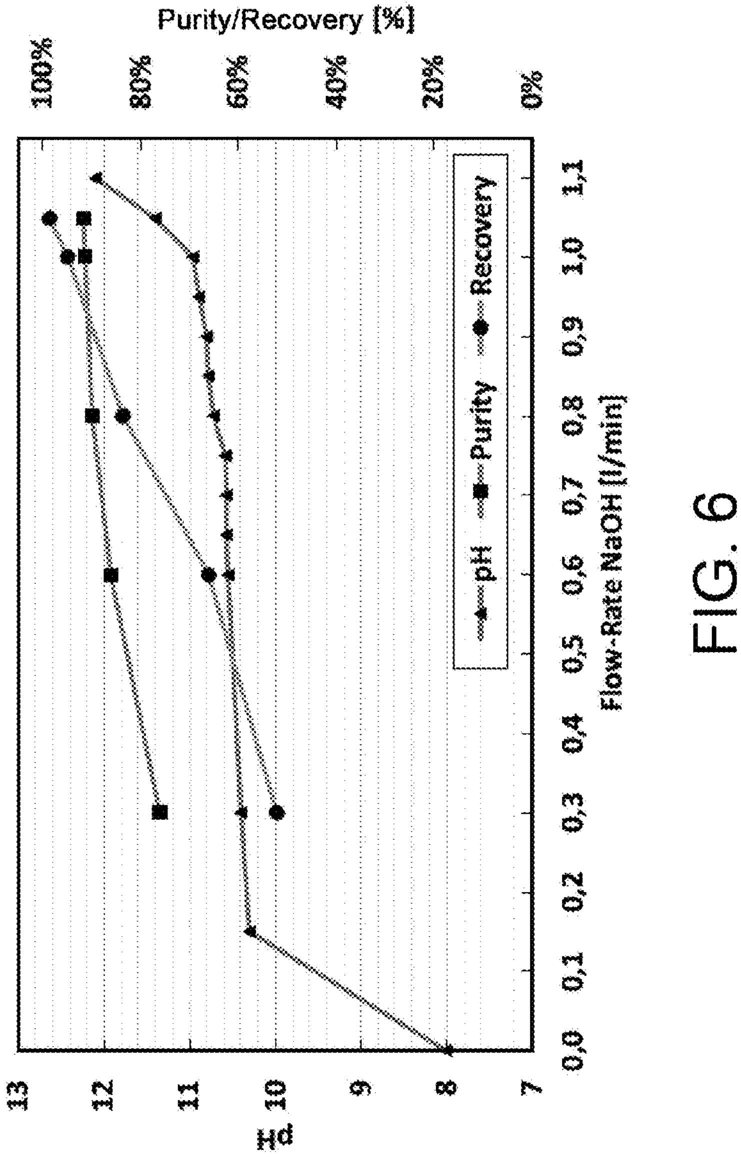
FIG. 6 shows a graph showing the $Mg(OH)_2$ recovery percentage and purity as a function of the pH of the solution.
Figures 7A, 7B, 7C:
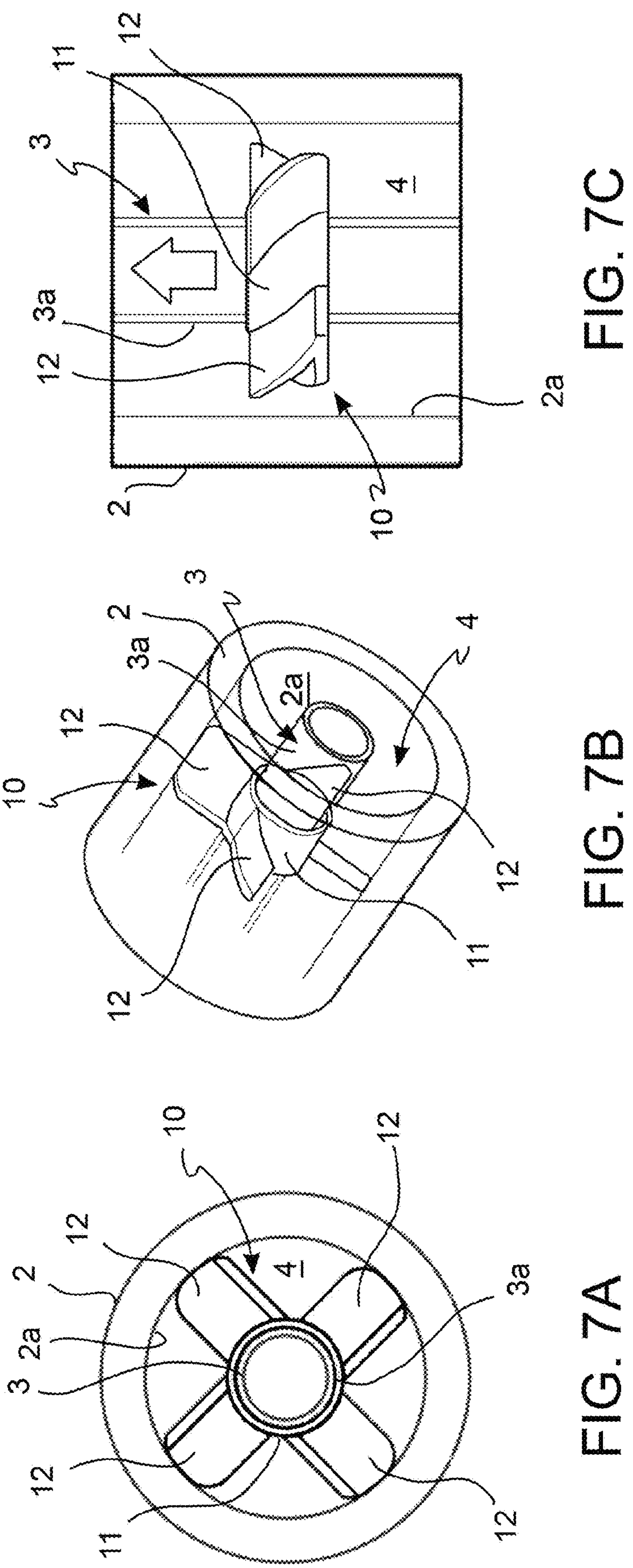
FIG. 7A shows a transverse section view of a detail of a different embodiment of the invention.
FIG. 7B shows a perspective view of the detail of FIG. 7A.
FIG. 7C shows a top view of the detail of FIG. 7B.
Figures 8A, 8B, 8C:
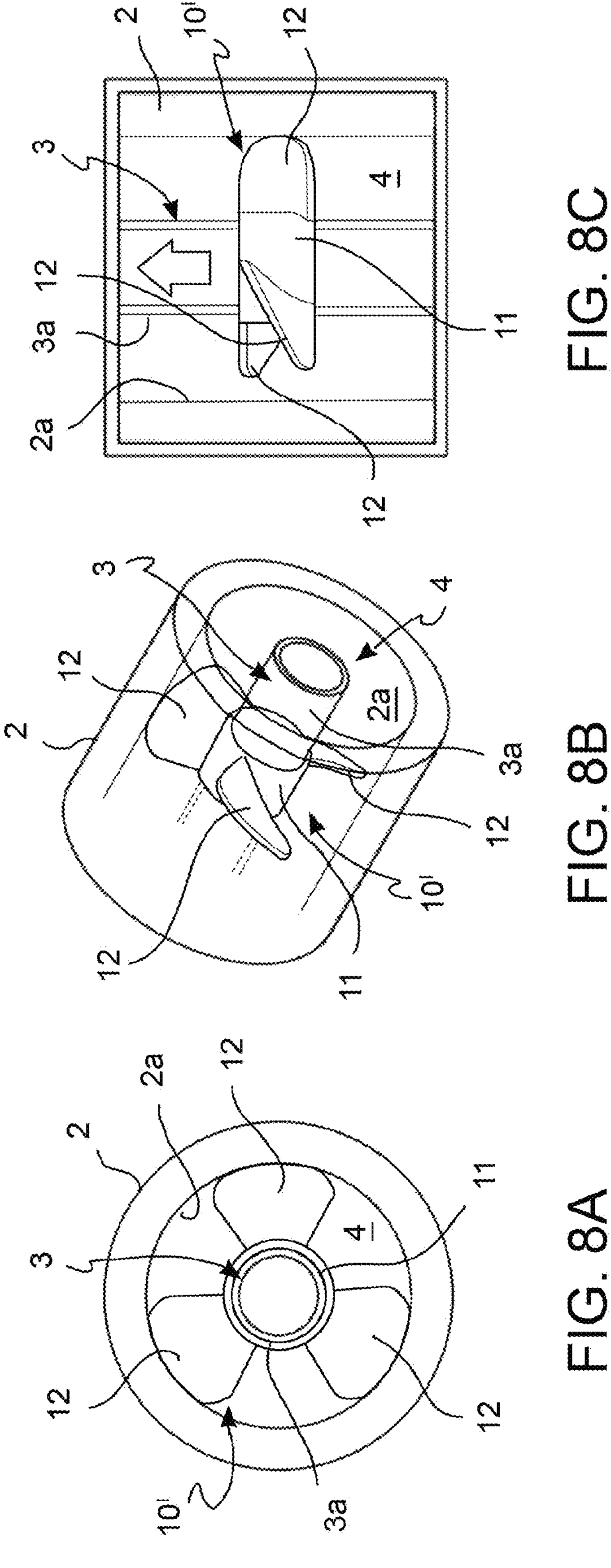
FIG. 8A shows a transverse section view of a detail of still a different embodiment of the invention.
FIG. 8B shows a perspective view of the detail of FIG. 8A.
FIG. 8C shows a top view of the detail of FIG. 8B.

Advancing towards the outlet opening 6, the fluid stream continues to curve, curling itself up about the inner tubular element 3, resulting in a global motion of the spiral type S as shown in FIG. 5.

In some cases, depending on the nature of the fluid, on the concentration thereof or on the consistency thereof, important dissipative phenomena may occur due to the viscosity of the fluid itself and to the friction with the walls. In such cases, the spiral flow would tend to lose coherence proceeding from the inlet opening 5 towards the outlet opening 6, turning into a flow with a prevalent direction parallel to the longitudinal axis X of the reactor shown in FIG. 1.

The inventors have found that by means of an appropriate inclination and intensity of the feeding of the second reactive fluid through the dispensing openings 9, the dissipation of the spiral motion S may be minimized if not canceled.

FIG. 5 shows that the outlet flow from a pair of dispensing openings 9, by virtue of the inclination of the openings themselves (angles α and β), occurs in a manner concordant with the direction of the spiral motion S, contributing to maintaining it along the entire axis of the reactor.

The first reactive fluid may be a concentrated solution of solubilized salts, such as, for example, a brine deriving from a saline, while the second reactive fluid may be a basic solution, for example, a sodium or potassium solution or a carbonate solution adapted for the precipitation of insoluble salts from the first reactive fluid. In other embodiments, the first and the second reactive fluids are inverted, i.e., the first reactive fluid may be a basic solution, while the second reactive fluid may be a concentrated solution of solubilized salts.

The reaction mixture exiting the outlet opening 6 of the outer tubular element 2 is, in any case, the mixture formed by the reaction between the first and the second reactive fluid and comprising the product of such reaction in suspension.

As shown in FIG. 1 by means of the dashed line, in certain embodiments, the reaction mixture exiting the outlet opening 6 is recirculated, in whole or in part, into the reactor 1 through the inlet opening 5 and/or the inlet opening 7, after topping up with the first or with the second reactive fluid (arrow F), depending on the case.

Therefore, the reactor 1 may comprise a system for the recirculation R of the reaction mixture exiting the outlet opening 6 of the outer tubular element 2 towards the inlet opening 5 of said outer tubular element 2 and/or towards the inlet opening 7 of the inner tubular element 3 and a system for filling/feeding F said first or second reactive fluid to said recirculation system R.

FIGS. 7A-7C and 8A-8C show two different variants of a particular embodiment of the reactor of the invention, in which one or more deflector elements 10, 10' are fixed to the outer wall 3*a* of the inner tubular element 3.

The deflector elements 10, 10' are fixed and comprise a tubular portion 11 from which fins 12 arranged helically (four in the deflector element 10 of FIGS. 7A-7C and three in the deflector element 10' of FIGS. 8A-8C) radially depart. The fins 12 may end at the inner surface 2*a* of the outer tubular element 2 or end earlier, so that the crest thereof is spaced apart from said inner surface 2*a*.

The deflector elements 10, 10' have the function of favoring the maintenance of the spiral flow S of the fluid in the annular channel 4.

Figure 9:
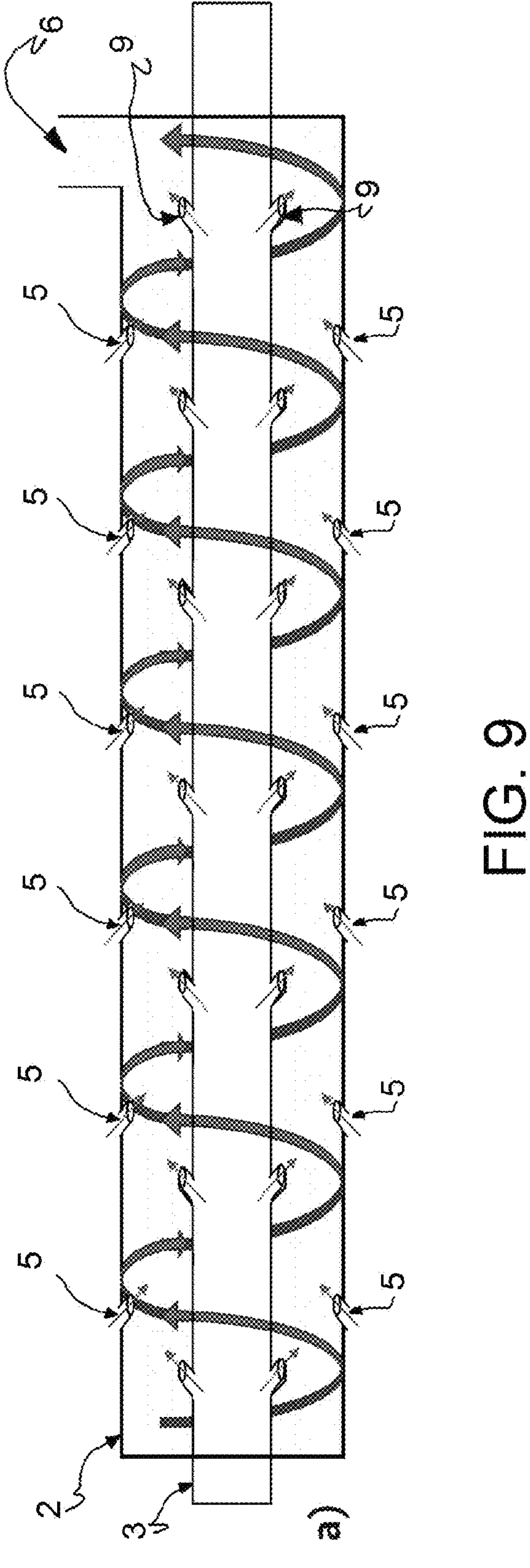
FIG. 9 shows a longitudinal section diagrammatic side view of the reactor of the invention according to a different embodiment.
Figure 10:
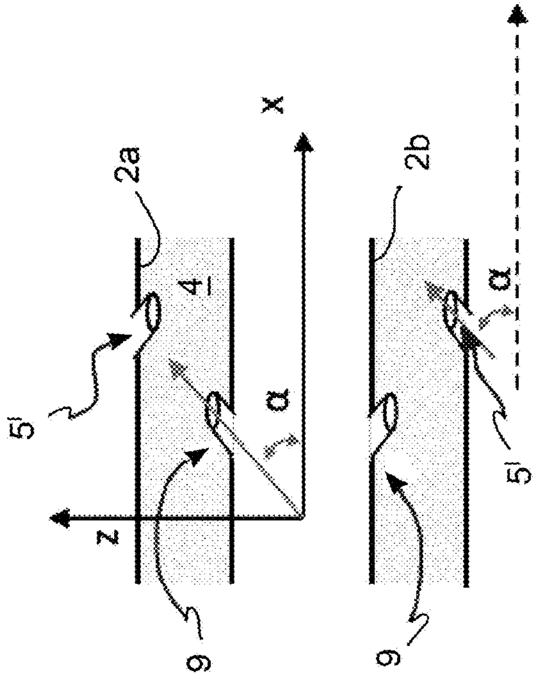
FIG. 10 shows a transparent side view of a portion of the reactor of FIG. 9.
Figure 11:
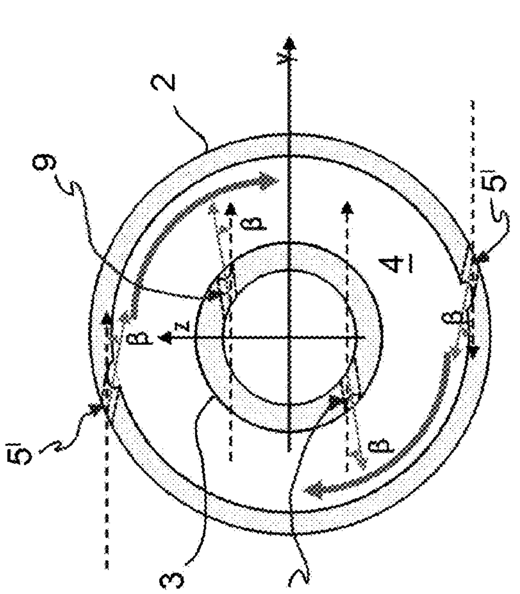
FIG. 11 shows a transverse section front view of the detail of FIG. 10.

FIGS. 9, 10 and 11 show a further embodiment of the reactor of the invention.

In such embodiment, the inlet opening 5 was replaced by a plurality of inlet openings 5' arranged along the outer tubular element 2 similarly to the arrangement of the dispensing openings 9 in the inner tubular element 3, but, with respect thereto, preferably offset so that each inlet opening 5' is placed in an intermediate position, along the longitudinal axis X, between two dispensing openings 9.

The inlet openings 5' may also be inclined by an angle α with respect to the longitudinal axis X of the reactor as shown in FIG. 10 and by an angle β with respect to the third axis y as shown in FIG. 11. The width of the inclination angles α and βof the inlet openings 5' falls within the previously defined ranges and may be the same or different with respect to the inclination angle of the dispensing openings 9.

The function of the plurality of inlet openings 5', in particular when arranged with inclination angles α and β as described above, is to favor the maintenance of the spiral motion in the annular channel 4 of the reactor 1 along the whole longitudinal axis X.

A second object of the invention is a precipitation/crystallization process which comprises the following steps:

i) providing a reactor 1 as defined above;
ii) introducing a first reactive fluid into the annular channel 4, at a first end 2' of the outer tubular element 2, so as to create a spiral flow S;
iii) at the same time, introducing a second reactive fluid into the inner tubular element 3;
iv) putting in contact, by means of a plurality of openings 9, preferably provided with nozzles 9*a* as defined above, said first reactive fluid with said second reactive fluid in said annular channel 4, generating a reaction mixture with spiral flow S;
v) extracting said reaction mixture from said annular channel 4, at a second end 2" of the outer tubular element 2;
vi) optionally, recirculating, wholly or in part, said reaction mixture into said annular channel 4 at said first end 2' of the outer tubular element 2 and/or in said inner tubular element 3 through the inlet opening 7.

In certain embodiments, when the first reactive fluid consists of a saline aqueous solution and the second reactive fluid consists of a basic aqueous solution, in which the basic solution is preferably a 1M solution of an alkaline hydroxide such as NaOH, the flow rate of the first reactive fluid in step i) is from 1 to 4 L/min and the flow rate of the second reactive fluid in step ii) is from 0.5 to 1.5 L/min.

In certain embodiments, the inlet pressure at the inner tubular element 3 is between 0.3 and 1 relative bar, depending on the flow rate of the second reactive fluid.

EXAMPLE

Using a reactor 1 as described above and, as the first reactive fluid, a saline aqueous solution having a composition as shown in table 1, the graph of FIG. 1 is obtained.

TABLE 1

| Saline solution composition Salt concentration (g/L) | | | | | | |
|---|---|---|---|---|---|---|
| $Na^+$ | $K^+$ | $Mg^{2+}$ | $Ca^{2+}$ | $Cl^-$ | $SO_4^{2-}$ | $HCO_3^-$ |
| 23.25 | 0.97 | 5.56 | 1.47 | 50.07 | 11.88 | 0.64 |

The graph in FIG. 1 shows the variation in the recovery percentage and in the percentage purity of $Mg(OH)_2$ precipitated from the saline solution indicated above when treating it with an aqueous solution of NaOH 1M, as a function of the flow rate of the basic solution supplied and consequently of the pH of the resulting reaction mixture. The flow rate of the saline solution was 2.5 L/min.

As shown in the graph, the maximum percentage of purity and of product recovery is obtained with a pH greater than 10 and with a flow rate of basic solution (used as a second reactive fluid) greater than 1 L/min.

It is apparent that only some particular embodiments of the present invention have been described, to which those skilled in the art will be able to make all changes required for the adaptation thereof to particular applications, without however departing from the scope of protection of the present invention.

The invention claimed is:

1. A reactive precipitation/crystallization reactor, comprising an outer tubular element and an inner tubular element, coaxial with respect to the outer tubular element along a longitudinal axis of the reactor to form, between an outer wall of the inner tubular element and an inner wall of the outer tubular element, an annular channel, wherein the outer tubular element comprises, at a first end, at least one inlet opening for a first reactive fluid and, at a second end, an outlet opening for a reaction mixture, and wherein the inner tubular element comprises an inlet opening for a second reactive fluid, wherein, the inner tubular element comprises, along the outer surface thereof, a plurality of dispensing openings for dispensing said second reactive fluid fed into the inner tubular element;

wherein dispensing nozzles are associated with the dispensing openings; and wherein the dispensing nozzles comprise a channel having a first section with a first diameter and a second section with a second diameter smaller than the first diameter, wherein said second section comprises a fluid dispensing hole, in which said dispensing hole has a diameter between 0.1 and 5 mm.

2. The reactor according to claim 1, wherein the inlet and outlet openings of the outer tubular element are placed along first and second axes which are perpendicular to the longitudinal axis of the reactor and parallel to an intersecting axis that intersects said longitudinal axis, so that a spiral flow is created inside the annular channel.

3. The reactor according to claim 2, wherein the first and second axes perpendicular to the longitudinal axis are offset by an equal distance on opposite sides with respect to the intersecting axis.

4. The reactor according to claim 1, wherein the dispensing openings are arranged equally spaced apart along said longitudinal axis.

5. A reactive precipitation/crystallization reactor, comprising an outer tubular element and an inner tubular element, coaxial with respect to the outer tubular element along a longitudinal axis of the reactor to form, between an outer wall of the inner tubular element and an inner wall of the outer tubular element, an annular channel, wherein the outer tubular element comprises, at a first end, at least one inlet opening for a first reactive fluid and, at a second end, an outlet opening for a reaction mixture, and wherein the inner tubular element comprises an inlet opening for a second reactive fluid, wherein, the inner tubular element comprises, along the outer surface thereof, a plurality of dispensing openings for dispensing said second reactive fluid fed into the inner tubular element;

wherein dispensing nozzles are associated with the dispensing openings; and wherein the dispensing nozzles are separate elements inserted into said dispensing openings and having a fluid dispensing hole having a diameter between 0.1 and 5 mm, wherein said dispensing hole ends at the level of the outer surface of the inner tubular element or protrudes therefrom.

6. The reactor according to claim 1, wherein the dispensing nozzles are inclined by a first angle with respect to the longitudinal axis of the reactor and by a second angle with respect to a third axis perpendicular both to the longitudinal axis and to the axis, wherein the first angle and the second angle independently have an width between 5° and 60°, so that dispensing of the second reactive fluid in the annular channel occurs in co-current with a spiral flow created inside the annular channel.

7. The reactor according to claim 1, comprising a system for recirculation of the reaction mixture exiting the outlet opening of the outer tubular element to the inlet opening of said outer tubular element and/or to the inlet opening of said inner tubular element and a system for filling/feeding said first or second reactive fluid to said recirculation system.

8. A reactive precipitation/crystallization reactor, comprising an outer tubular element and an inner tubular element, coaxial with respect to the outer tubular element along a longitudinal axis of the reactor to form, between an outer wall of the inner tubular element and an inner wall of the outer tubular element, an annular channel, wherein the outer tubular element comprises, at a first end, at least one inlet opening for a first reactive fluid and, at a second end, an outlet opening for a reaction mixture, and wherein the inner tubular element comprises an inlet opening for a second reactive fluid, wherein, the inner tubular element comprises, along the outer surface thereof, a plurality of dispensing openings for dispensing said second reactive fluid fed into the inner tubular element;

wherein one or more deflector elements are fixed to the outer wall of the inner tubular element.

9. The reactor according to claim 8, wherein the deflector elements are fixed and comprise a tubular portion from which fins helically arranged radially depart, wherein said fins end at the inner surface of the outer tubular element or end earlier, so that a crest thereof is spaced apart from said inner surface.

10. The reactor according to claim 1, wherein the outer tubular element comprises a plurality of inlet openings arranged along the outer tubular element similarly to an arrangement of the dispensing openings in the inner tubular element, but, offset so that each inlet opening is placed in an intermediate position, along the longitudinal axis, between two dispensing openings.

11. The reactor according to claim 10, wherein the inlet openings are inclined by a first angle with respect to the longitudinal axis of the reactor and by a second angle with respect to the third axis, wherein the first angle and second the angle independently have a width between 5° and 60°.

12. A reactive precipitation/crystallization method, comprising the following steps:

i) providing a reactor as defined in claim 1;

ii) introducing the first reactive fluid into the annular channel of said reactor, at a first end of the outer tubular element, so as to create a spiral flow;

iii) at a same time, introducing the second reactive fluid into the inner tubular element of said reactor;

iv) putting in contact, by the plurality of openings, said first reactive fluid with said second reactive fluid in said annular channel, generating a reaction mixture with spiral flow;

v) extracting said reaction mixture from said annular channel, at a second end of the outer tubular element;

vi) recirculating, wholly or in part, said reaction mixture into said annular channel at said first end of the outer tubular element.

13. The method according to claim 12, wherein:

the first reactive fluid is a concentrated solution of solubilized salts, comprising a brine deriving from a saline, while the second reactive fluid is a basic solution, comprising a sodium or potassium solution or a carbonate solution adapted for precipitation of insoluble salts from the first reactive fluid; or the first reactive fluid is a basic solution, while the second reactive fluid is a concentrated solution of solubilized salts; and wherein the inlet pressure at the inner tubular element is from 0.3 to 1 relative bar.

14. The method according to claim 13, wherein, when the first reactive fluid is a saline solution and the second reactive fluid is a basic solution, in which the basic solution is a 1M solution of an alkaline hydroxide the flow rate of the first reactive fluid in step i) is from 1 to 4 L/min and the flow rate of the second reactive fluid in step ii) is from 0.5 to 1.5 L/min.

* * * * *